United States Patent
McHugh

(10) Patent No.: US 10,184,310 B2
(45) Date of Patent: Jan. 22, 2019

(54) FLOW CONTROL MODULE

(71) Applicant: Cameron International Corporation, Houston, TX (US)

(72) Inventor: Edmund Peter McHugh, Longford Town (IE)

(73) Assignee: Cameron International Corporation, Houston, TX (US)

( * ) Notice: Subject to any disclaimer, the term of this patent is extended or adjusted under 35 U.S.C. 154(b) by 232 days.

(21) Appl. No.: 15/169,549

(22) Filed: May 31, 2016

(65) Prior Publication Data

US 2017/0342792 A1  Nov. 30, 2017

(51) Int. Cl.

| E21B 33/03 | (2006.01) |
|---|---|
| E21B 33/068 | (2006.01) |
| E21B 34/02 | (2006.01) |
| E21B 47/00 | (2012.01) |
| E21B 49/08 | (2006.01) |
| G01F 1/74 | (2006.01) |
| E21B 33/038 | (2006.01) |

(52) U.S. Cl.
CPC ............ *E21B 33/03* (2013.01); *E21B 33/038* (2013.01); *E21B 33/068* (2013.01); *E21B 34/02* (2013.01); *E21B 47/00* (2013.01); *E21B 49/08* (2013.01); *G01F 1/74* (2013.01)

(58) Field of Classification Search
CPC ...... E21B 33/03; E21B 33/038; E21B 33/068; E21B 34/02; E21B 47/00; E21B 49/08
See application file for complete search history.

(56) References Cited

U.S. PATENT DOCUMENTS

| 2010/0206547 A1 | 8/2010 | Donald et al. |
| 2014/0116716 A1* | 5/2014 | Vincent ............... E21B 43/01 166/351 |

FOREIGN PATENT DOCUMENTS

| WO | 2008034024 A1 | 3/2008 |
| WO | 2013126592 A2 | 8/2013 |

OTHER PUBLICATIONS

PCT International Search Report & Written Opinion for PCT Application No. PCT/US2017/033861 dated Jul. 6, 2017; 13 Pages.

\* cited by examiner

*Primary Examiner* — Caroline N Butcher
(74) *Attorney, Agent, or Firm* — Fletcher Yoder, P.C.

(57) ABSTRACT

A system includes a flow-through component fluidly coupled to a wellhead and including an annular passage disposed about a central flow-through bore. The annular passage is transverse to the central flow-through bore. The central flow-through bore is downstream of the annular passage. The system also includes a first 90-degree elbow fluidly coupled to the flow-through component, a multi-phase flow meter disposed downstream of, and fluidly coupled to the first 90-degree elbow, a second 90-degree elbow disposed downstream of, and fluidly coupled to, the multi-phase flow meter, a monitor fluidly coupled to the second 90-degree elbow, and a choke disposed downstream of, and fluidly coupled to, the second 90-degree elbow, wherein, the central flow-through bore is downstream of the choke.

16 Claims, 9 Drawing Sheets

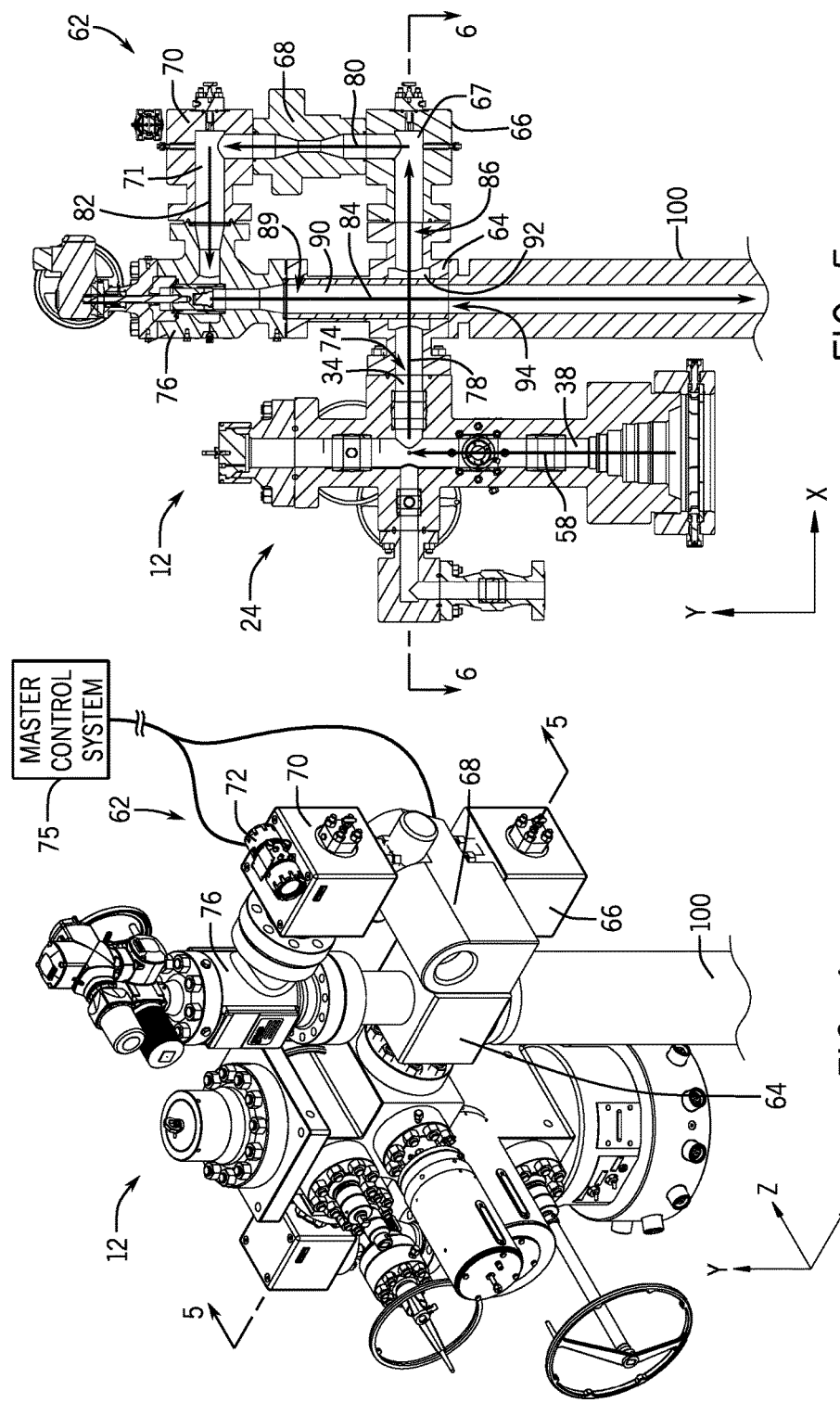

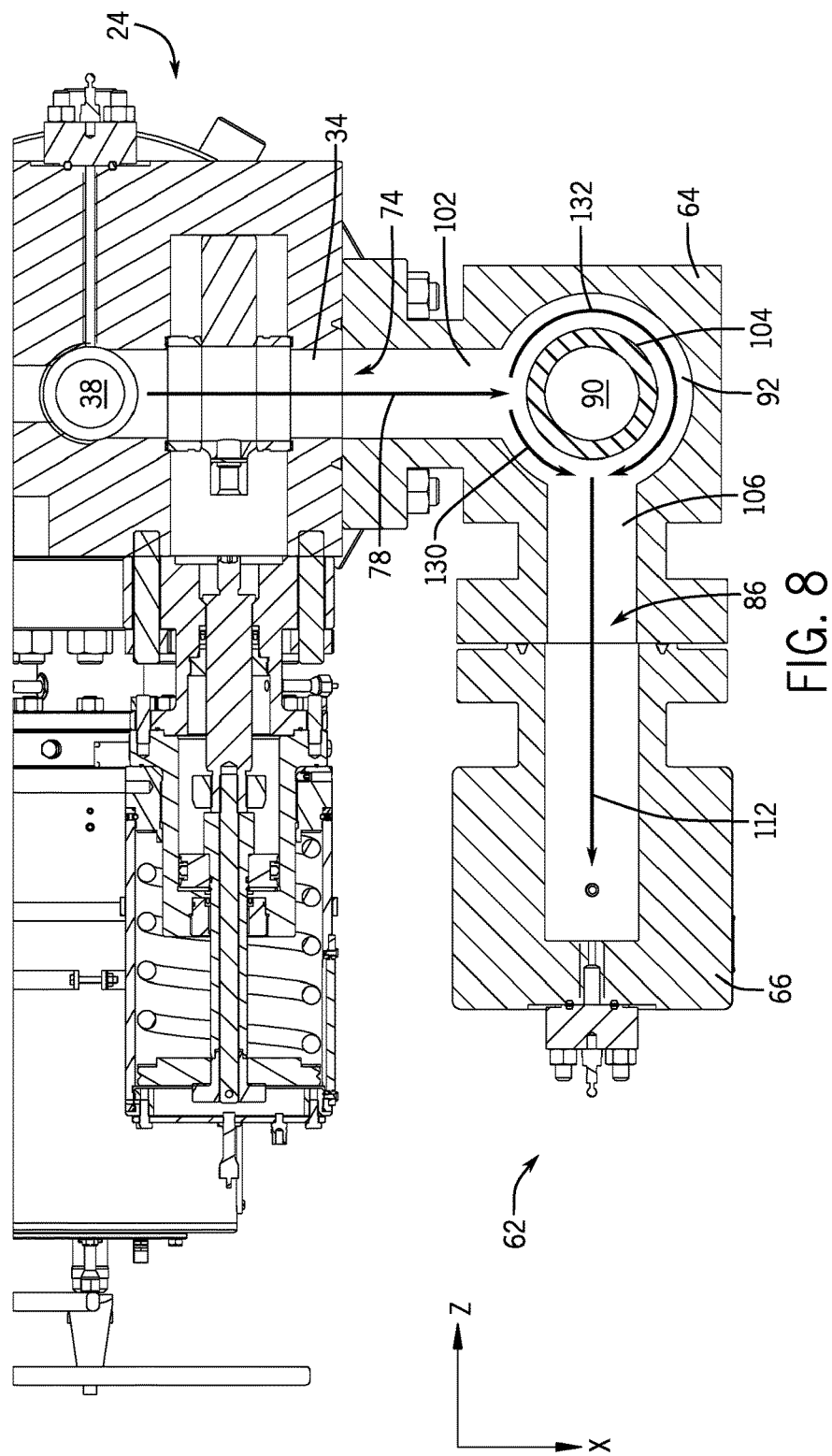

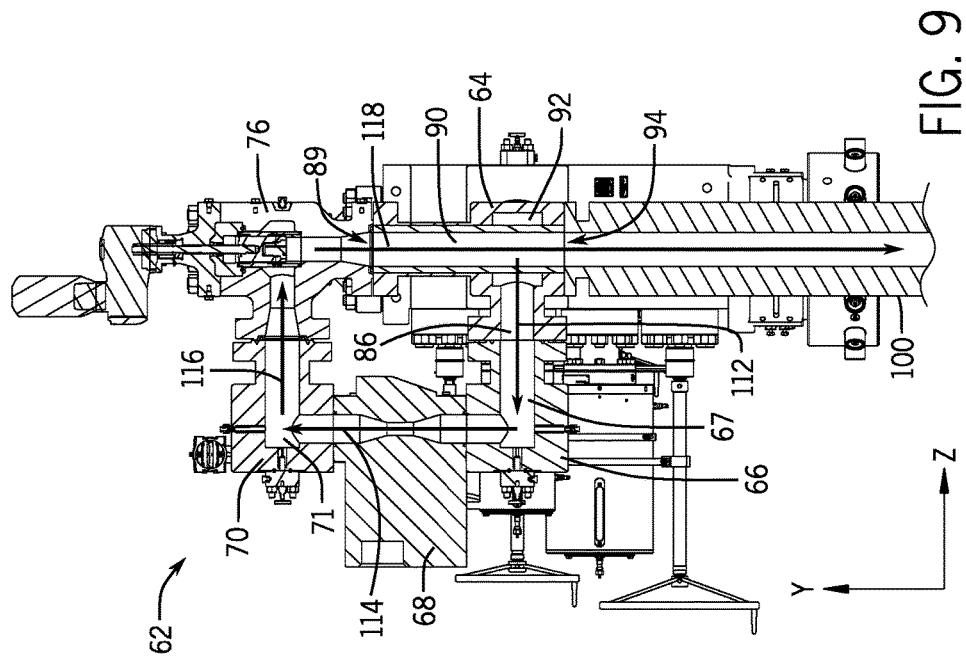

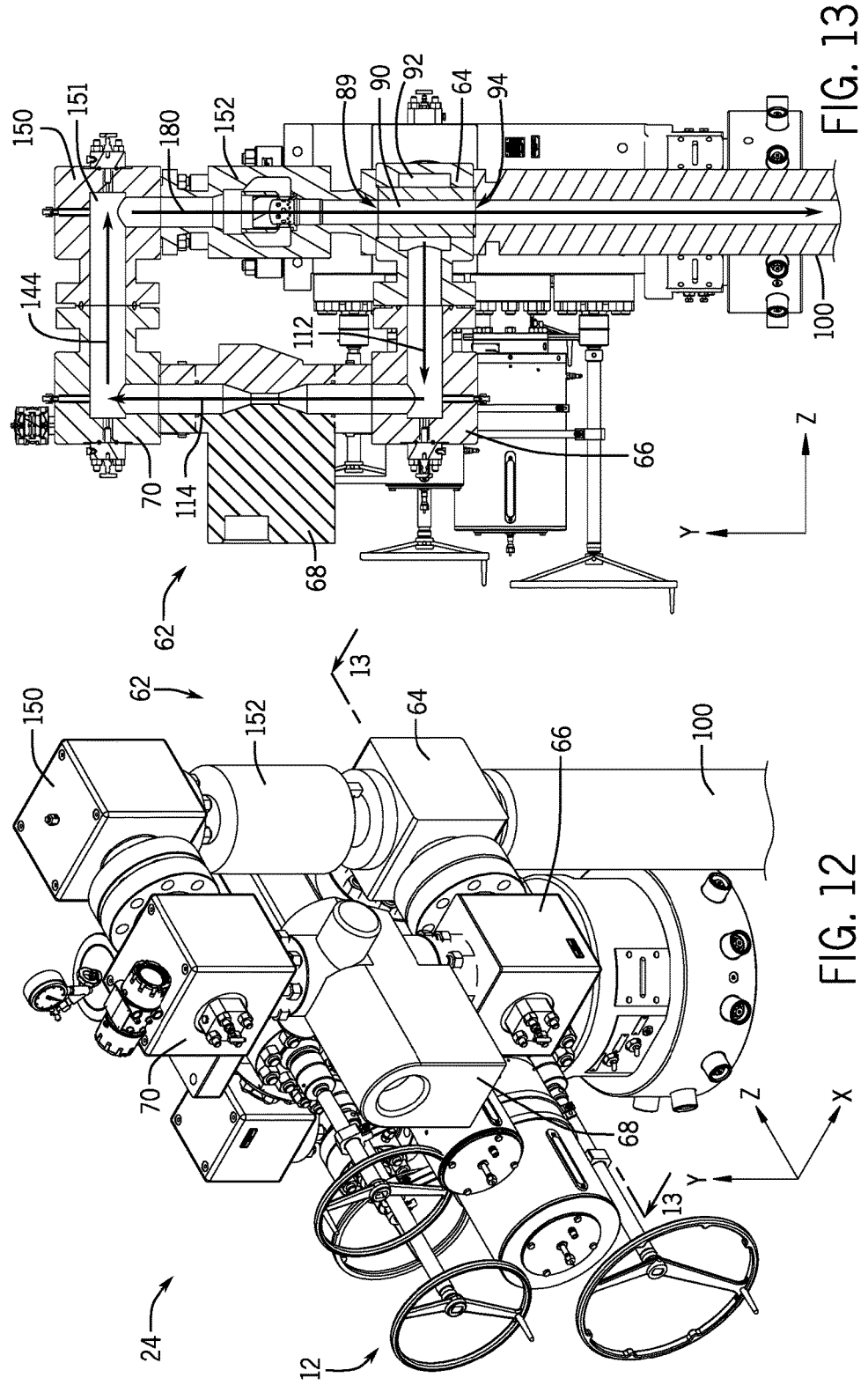

FLOW CONTROL MODULE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Oil and natural gas have a profound effect on modern economies and societies. In order to meet the demand for such natural resources, numerous companies invest significant amounts of time and money searching for, accessing, and extracting oil, natural gas, and other subterranean resources. Extraction systems, which are also described as drilling and production systems, facilitate harvesting of these resources via a well. These systems can be located onshore or offshore, depending on where the resources are located.

Most extraction systems have a wellhead assembly located at or near the surface, providing an interface between the well and the equipment located above. Wellhead assemblies are robust pieces of equipment that often remain in operation for 20-30 years, or more.

Wellhead assemblies can benefit from monitoring and control equipment. But such equipment advances technologically at a relatively fast pace, and may be specifically configured to meet a particular short-term need during the well's decades-long lifespan. Furthermore, the wellhead assembly's configuration may restrict the space available for the desired monitoring and control equipment. A user may wish to utilize more recent or different monitoring and control equipment but not want to undertake the considerable effort and expense of replacing the entire wellhead assembly.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 4 is a perspective view of the wellhead assembly of FIGS. 2 and 3 with a flow control module installed;

FIG. 5 is a section, side view of the flow control module shown in FIG. 4;

FIG. 8 is a section, top view of the flow control module shown in FIG. 7, illustrating the flow-through component with a bend;

FIG. 9 is a section, side view of the flow control module shown in FIGS. 7 and 8;

FIG. 12 is a perspective view of the wellhead assembly with an embodiment of the flow control module having a flow through component with a bend and an in-line choke; and FIG. 13 is a section, side view of the flow control module shown in FIG. 13.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Mineral extraction systems are commonly used to extract various minerals and natural resources, including hydrocarbons (e.g., oil and/or natural gas) from a mineral deposit or reservoir. Further, such systems typically include a wellhead assembly that has a tree assembly and through which the mineral or resource is extracted. Wellhead and tree assemblies may include control lines, casings, hangers, valves, chokes and the like, that control drilling and/or extraction operations. These assemblies may be in operation for 20-30 years or more. The assemblies' monitoring and control equipment may become outdated within a 3-5 year period. Moreover, monitoring and control equipment may require reconfiguration for different short-term operations beneficial during the well's decades-long operational life. The space available for one configuration may not be suitable for another. The cost and effort of replacing the entire wellhead assembly to install new or different monitoring and control equipment can be quite high, making it impractical.

The disclosed techniques include the removal and replacement of existing components (e.g., production flow spool tree, choke, bend, etc.), and replacement with a flow control module. As will be described in more detail below, the flow control module may be configured to support various processes, allowing for the use of more recent or different monitoring and control equipment, for example, without significant alteration of the wellhead assembly.

Figure 1:
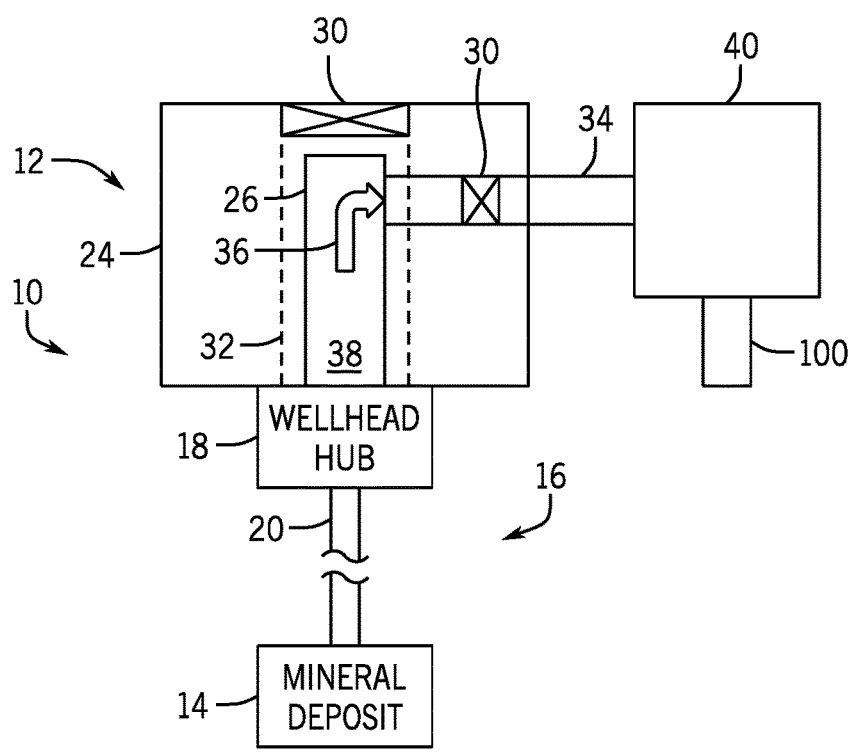
FIG. 1 is a schematic of a mineral extraction system.

FIG. 1 is a schematic of an exemplary mineral extraction system 10 configured to extract various natural resources, including hydrocarbons (e.g., oil and/or natural gas), from a mineral deposit 14. Depending on where the natural resource is located, the mineral extraction system 10 may be land-based (e.g., a surface system) or subsea (e.g., a subsea system). The illustrated system 10 includes a wellhead assembly 12 coupled to the mineral deposit or reservoir 14 via a well 16. Specifically, a wellbore 20 extends from the reservoir 14 to a wellhead hub 18 located at or near the surface.

The illustrated wellhead hub 18, which may be a large diameter hub 18, acts as an early junction between the well 16 and the equipment located above the well. The wellhead hub 18 may include a complementary connector, such as a collet connector, to facilitate connections with the surface equipment. The wellhead hub 18 may be configured to support various strings of casing or tubing that extend into the wellbore, and in some cases extending down to the mineral deposit 14.

The wellhead assembly 12 generally includes devices and components that control and regulate activities and conditions associated with the well 16. For example, the wellhead assembly 12 may include what is known in the industry as a Christmas tree assembly 24, or tree designed to route the flow of produced minerals (e.g., produced flow) from the mineral deposit 14 and the wellbore 20 to the surface, to regulate pressure in the well 16, and to facilitate the injection of chemicals into the wellbore 20 (e.g., downhole). Christmas trees 24 are typically an assemblage of valves, flow paths, and access points employed to monitor, control, and service the well 16.

FIG. 1 illustrates a tubing spool tree 24 (e.g., horizontal tree or spool tree) that supports a hanger 26 (e.g., a tubing hanger or a casing hanger). Tubing spool trees 24 are just one type of tree. The disclosed embodiments are also applicable to trees 24 which do not support a hanger 26, such as traditional, vertical, fracking, or hybrid trees. The disclosed embodiments may also be applicable to instances in which control of the well is conducted directly through wellhead equipment such as a casing head, tubing head, or other wellhead spool, for example.

The illustrated tubing spool tree 24 has a frame disposed about a body, which cooperate to support various components and define various flow paths for operating the well 16. For example, the tubing spool tree 24 has a spool bore 32 that is in fluid communication with the well 16 and that facilitates completion and workover operations, such as insertion of tools, landing of hangers 26, and injection of chemicals "downhole" into the well 16, to name just a few.

Minerals extracted from the well 16 (e.g., oil and natural gas) are routed (arrow 36) from the spool bore 32 and into a production flow bore 34, which in the illustrated embodiment is a horizontal production flow bore 34 or wing bore. The horizontal production flow bore 34 is in fluid communication with a tubing hanger bore 38 that is fluidly connected to the wellbore 20. Produced minerals may flow from the wellbore 20, through the tubing hanger bore 38 and/or spool bore 32, and through the production fluid bore 34. Conversely, the various bores 20, 32, 34, 38 can be used to inject fluids and materials into the well 16, and can be used as access points for workover and completion activities.

To control and regulate flow in and out of the well 16, the tubing spool tree 24 carries various valves 30—e.g., ball valves, gate valves—in fluid communication with the flow paths defined by the above-described bores (e.g., 20, 32, 34 and 38).

The illustrated wellhead assembly 12 also includes a flow module assembly 40 that couples the flow paths of the tree 24 to a production flow line 100, through which produced fluid may be pumped for storage, transport, refining, etc. As described in more detail below, the flow module assembly 40, which may be a flow control module 62, as is shown in FIG. 4, may include wellhead monitoring and control equipment that can be more easily removed, configured, and replaced than traditional devices.

Figure 2:
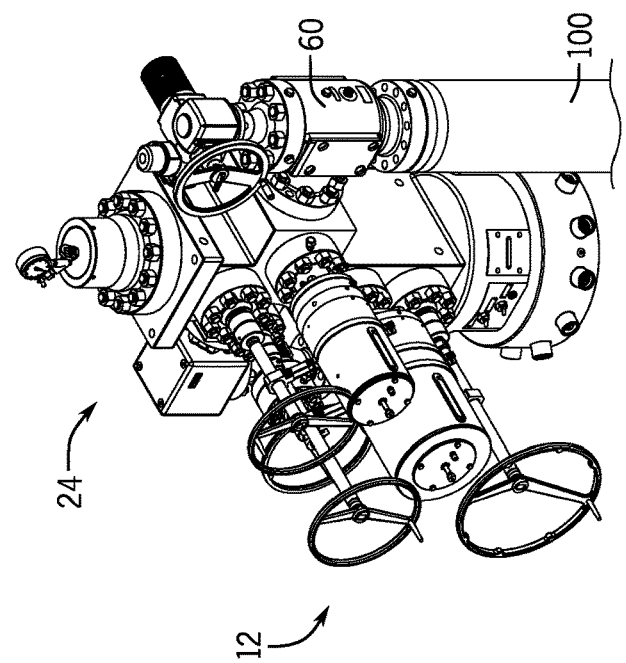
FIG. 2 is a perspective view of an embodiment of a wellhead assembly having a right-angle choke.

FIG. 2 is a perspective view of a wellhead assembly 12 with a choke 60 connecting the tree 24 to the production flow line 100. As illustrated, the choke 60 is angled or bent 90 degrees. Thus, fluid flow enters the choke 60, encounters a restriction (e.g., a plug and cage), and exits the choke at a reduced flow rate and in a direction perpendicular to the choke's inlet.

An operator may want to install a different choke 60, or additional monitoring and control equipment downstream of the tree 24. However, the space available may be limited, or the distance and placement of the tree 24 outlet with respect to the inlet of the production flow line 100 may be fixed. Such concerns may arise both in relation to existing "brownfield" operations and new "greenfield" installations.

Figure 3:
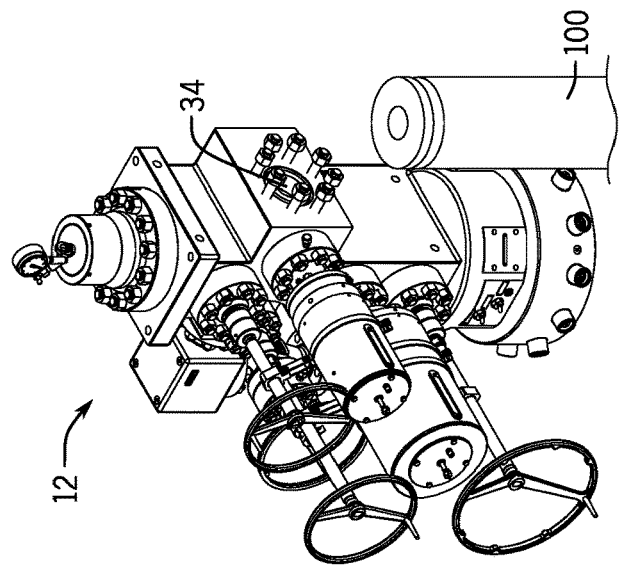
FIG. 3 is a perspective view of the wellhead assembly of FIG. 2 with the choke removed.

FIG. 3 depicts the wellhead assembly 12 with the choke 60 removed. As can be seen, the choke's 60 removal interrupts the flow path (e.g., through the production fluid bore 34) from the tree 24 to the production flow line 100. FIG. 4 depicts a flow control module 62 that reconnects this flow path without substantial repositioning, reconfiguring, or replacement of the wellhead spools, tree 24 or production flow line 100.

Installation of this flow control module 62—which includes more components than the previously installed choke 60 (FIG. 2), e.g., control, monitoring, conditioning, and flow control equipment—is facilitated by a flow-through component 64. In addition to the flow-through component 64, the illustrated flow control module 62 includes a first elbow 66, a multi-phase flow meter 68, a second elbow 70, a scanner 72, and a choke 76.

In the illustrated embodiment, the first and second elbows 66, 70 receive a fluid flow and bend the flow 90 degrees such that the fluid flow exits the first and second elbows 66, 70 in a direction perpendicular to the direction of entry. The multi-phase meter 68 is disposed between the first and second elbows 66, 70. This meter 68 can measure the flow's constituents, and the flow rate and composition of those constituents, for example. The multi-phase meter 68 may use a gamma radiation source to perform a live scan, determine the density of the fluid flowing through it, and/or determine the flow's water-to-gas ratio. Advantageously, and as is discussed further below, the modular nature of the flow control module 62 facilitates placement of the meter 68 in various configurations. As is well known, the choke 76 conditions the flow by affecting its flow rate and/or pressure. The choke 76 may be fixed, adjustable, inline, or any number of choke designs. Indeed, the choke 76 may be the same choke 60 as previously shown in FIG. 2, but now incorporated into the flow control module 62. Alternatively, the choke 76 may be an entirely different choke.

As depicted and with reference to the X-, Y-, and Z-axes in FIG. 4, the illustrated flow control module 62 is generally aligned with the X-axis. Configurations in which the flow control module 62 is aligned with other axes are also envisaged and are discussed below. In operation, one configuration's functionality may not substantially differ from another configuration's. Spatial constraints around the wellhead assembly 12 may make one configuration more desirable for a given application than another. For example, in one application, an adjacent wellhead assembly 12 or other equipment may constrain the available volume for the flow control module 62 in the Z-direction, giving volume in the Z-direction a premium over volume in the X-direction. The flow control module 62 may then be aligned with the X-axis to conserve or accommodate the limited space in the Z-direction. In other applications, multiple wellhead assemblies 12 may be installed in one space. In such an application, it may be beneficial to have flow control modules 62 that can be installed in several different configurations such that the multiple wellhead assemblies 12 can fit together in a small or predefined volume in order to reduce cost.

The flow control module 62 may also include control systems that automate aspects of the wellhead assembly 12. That is, the flow control module 62 may include components that receive various inputs and communications and, based on those, perform various tasks and functions. For example, the illustrated flow control module 62 includes a master control system 75 that acts as a hub for data inputs, communications, and operational commands. This system 75 may have a processor, memory and appropriate software to receive the inputs, synthesize them, and produce commands or communications beneficial for operation of the wellhead 12. Moreover, it may include communications equipment that enable it to receive commands and provide data to a remote location. The master control system 75 may receive data from a monitor and/or scanner 72 on the flow control module 62. The monitor and/or scanner 72 may capture and store various data points about the produced flow, which is then sent to the master control system 75. The meter 68 may communicate the information it has obtained to the master control system 75. Indeed, any number of the components of the wellhead assembly 12 may have condition-detecting sensors or equipment that can send data to the master control system 75, either wirelessly or through a cable, for instance. Moreover, it is also envisaged that the processing, communication, and memory components of the master control system 75 may be distributed throughout the wellhead assembly 12 and operate as a network, rather than central hub.

FIG. 5 is a section, side view taken along line 5-5 of FIG. 4, illustrating a fluid flow path for produced flow through the flow control module 62. (The following discussion makes reference to the X-, Y-, and Z-axes provided in FIGS. 4-13.) Produced flow from the well 16 (indicated by arrow 58), for example, is routed from the tree 24 and into the flow-through component 64 in the X-direction (arrow 78). The production flow enters a first inlet 74 of the flow-through component 64 and proceeds through an annular passage 92, which directs the flow around a central flow-through bore 90 of the flow through component 64. The specifics of how the flow through component 64 directs the flow through the annular passage 92 and around the central flow-through bore 90 are described in more detail below with regard to FIG. 6. The flow exits the flow through component 64 via a first outlet 86 flowing in the X-direction (arrow 78). The first elbow 66, which includes a fluid passage 67, receives the flow and bends the flow 90 degrees, causing it to flow in the Y-direction (arrow 80).

The flow exits the first elbow 66 and enters the multi-phase flow meter 68. The multi-phase flow meter 68 meter can measure the flow's constituents (e.g., the water-to-gas ratio), and the flow rate and composition of those constituents. Some multi-phase meters 68 have specific installation or configuration parameters. For example, installing the meter 68 such that produced flow travels upward (e.g., in the Y-direction, arrow 80) through it may increase the meter's 68 accuracy. Installing the meter 68 upstream of the choke 76, so that the measured flow is at a higher pressure than the flow downstream of the choke 76, may also improve the meter's 68 accuracy. Further still, placing one or more 90-degree bends or elbows 66 upstream of the meter agitates and homogenizes the produced flow, which may improve the meter's 68 accuracy.

The produced fluid flow exits the meter 68 flowing in the Y-direction (arrow 80) and enters the second elbow 70. The second elbow 70, which includes a fluid passage 71, bends or directs the flow in the X-direction (arrow 82). The second elbow 70 is coupled to the choke 76, which is the penultimate component before the produced flow returns through the flow through component 64 and into to the production flow line 100. The choke 76 conditions the flow by affecting its flow rate and/or pressure. The illustrated choke 76 has a right-angle design that bends or directs the produced fluid flow in the Y-direction (arrow 84).

Thus, the now-measured and now-conditioned produced flow has nearly completed a loop and is aligned with the production flow line 100. The flow exiting the choke 76 completes the loop by reentering the flow-through component 64 via a second inlet 89. The produced flow flows through a central flow-through bore 90 that is segregated from the annular passage 92 (see FIG. 6). The produced flow exits the flow-through component 64 via a second outlet 94 and flows into the production flow line 100. Flow that was previously routed from the tree 24, into the choke 60, and, ultimately, into the production flow line 100 (see FIG. 2) can, with the flow control module 62 installed, be routed from the tree 24, into the flow meter 68 and any number of other components included in the flow control module 62, and back into the production flow line 100 without substantial repositioning, reconfiguring, or replacement of the wellhead assembly's other components, like the tree 24 and/or the production flow line 100.

In the above-described embodiment, reference is made to first and second elbows 66, 70. However, embodiments in which such elbows are arcuate, acute or obtuse angles, as well as right angles, are envisaged. For example, the angle of the elbow may be 30, 35, 40, 45, 50, 55, 60, 65, 70, 75, 80, 85, 90, 95, 100, 105, 110, 115, or 120 degrees. Or such components may not bend flow at all.

Moreover, the flow control module 62 may include other components to support a variety of processes, including chemical injection points, diagnostic monitoring components, actuators, automated gate valve components, communications devices, automated flow control components, flow conditioning and treatment devices, separation equipment, manifolds to accept multiple inputs and provide multiple outputs, valves, and the like.

Advantageously, using a variety of elbows 66, 70, the flow control module 62 can be reconfigured to include new, different, and/or further components that fit within a limited or tight space. Indeed, placing standard API flange connections, or other types of uniform connections, on the elbows 66, 70 and various other components of the flow control module 62, can provide a modular assembly where components can be removed, relocated, and replaced with relative ease. Alternatively, if a more fixed or more robust solution is desired, various flow control module's 62 various components could be integrated with one another.

The flow control module 62 can also be configured for the introduction of materials (e.g., water or chemical injection, steam injection, proppant) into the well. For example, the flow control module could be connected to a source that injects fluid to flow in an opposite direction as discussed above, from the source (e.g., chemical injection, scale squeeze), through the flow control module 62 and into the tree 24 and/or well 16. Based on communications or data inputs, the master control system 75 may initiate an automated process, such as injecting desired chemicals into the produced flow, greasing a moving component, commanding an actuator to move a valve or the choke, or effecting other operations of a similar nature.

Figure 6:
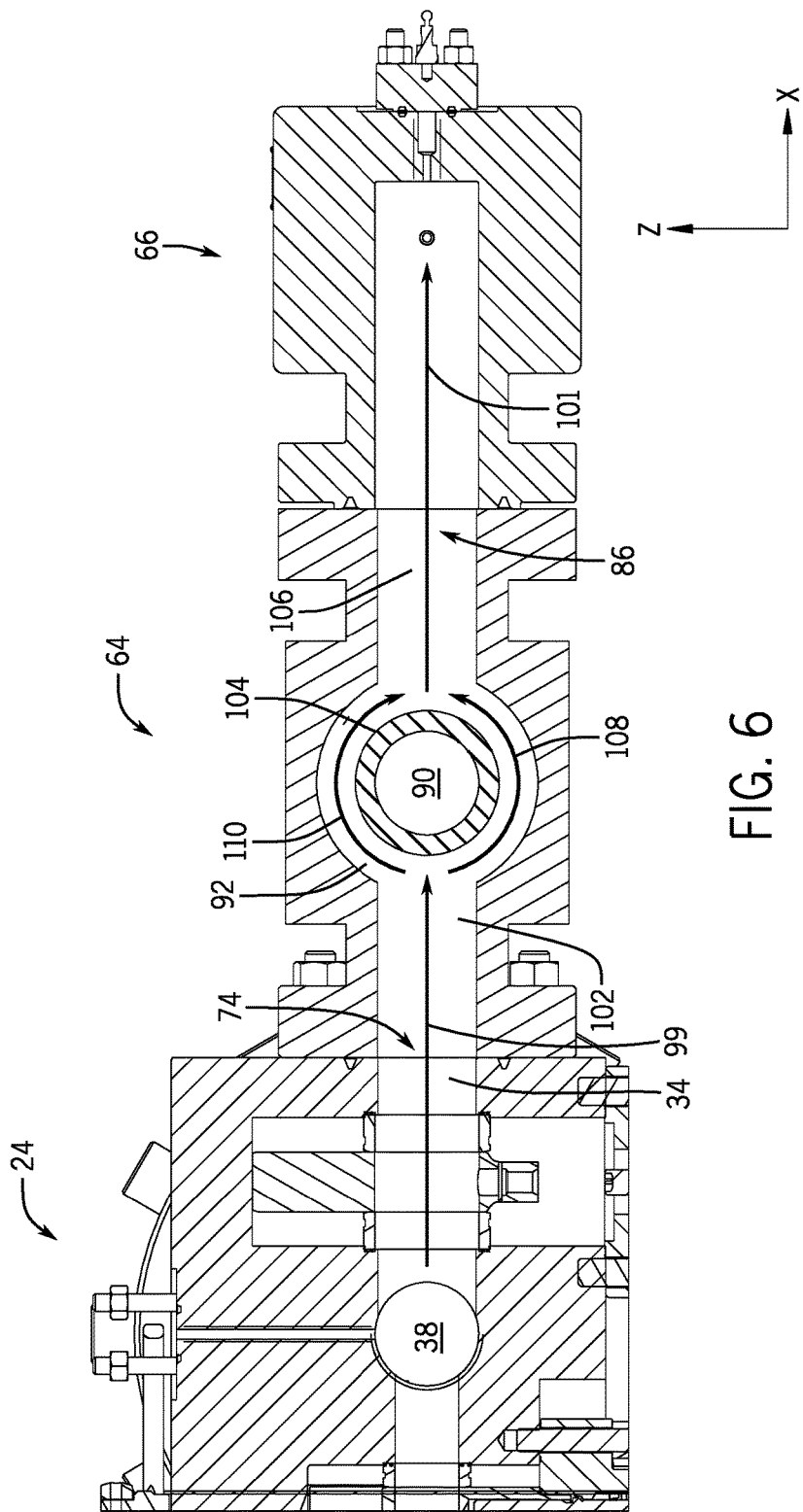
FIG. 6 is a section, top view of the flow control module shown in FIGS. 4 and 5, illustrating the flow-through component.

FIG. 6 is a section, top view taken along line 6-6 of FIG. 5, illustrating produced fluid flow through the flow through component 64. Produced fluid flow proceeds through the production fluid bore 34 of the tree 24 and into the flow through component 64 via the first inlet 74. The produced fluid flow proceeds in the X-direction (arrow 99) from the first inlet 74 through an entry bore 102, which extends in the X-direction, and to the annular passage 92. As the produced fluid flow reaches the annular passage 92, the produced fluid flow is split (arrows 108, 110) and diverted around the central flow through bore 90 of the flow-through component 64. The annular passage 92 is annular about a central axis (e.g., arrow 84 in FIG. 5) of the central flow through bore 90. A downstream portion of the produced fluid flows in the Y-direction through the central flow-through bore 90 (FIG. 5, arrow 84), which is segregated from the annular passage 92 by an annular wall 104. Produced fluid flow through the central flow through bore 90 is substantially transverse to produced fluid flow through the annular passage 92. That is, an upstream portion of the produced fluid flows through the annular passage 92 in the X-direction and a downstream portion of the produced fluid flows through the central flow through bore 90 in the Y-direction. After flowing around the central flow through bore 90, the split produced fluid flows (arrows 108 and 110) converge and proceed in the X-direction (arrow 101) through an exit bore 106, which extends in the X-direction, to the first outlet 86. The produced fluid exits the flow-through component 64 via the first outlet 86 and enters the first elbow 66. The produced fluid flow proceeds through the various other components of the flow control module (e.g., the first elbow 66, the multi-phase flow meter 68, the second elbow 70, and the choke 76) before returning to, and flowing through, the flow through component 64 via the central flow-through bore 90.

In the illustrated embodiment of the flow-through component 64, the entry bore 102, and the exit bore 106 are substantially aligned with one another (e.g., in the X-direction) such that the produced fluid exits the flow-through component 64 at the first outlet 86 traveling in the same direction that it entered the flow through component 64 at the first inlet 74. However, embodiments of the flow through component 64 in which the entry bore 102 and the exit bore 106 are not aligned with one another, and the produced fluid flow exits the flow-through component 64 in a different direction than it entered the flow-through component are also envisaged. Such an embodiment of the flow-through component is shown and described with regard to FIGS. 7-9.

Figure 7:
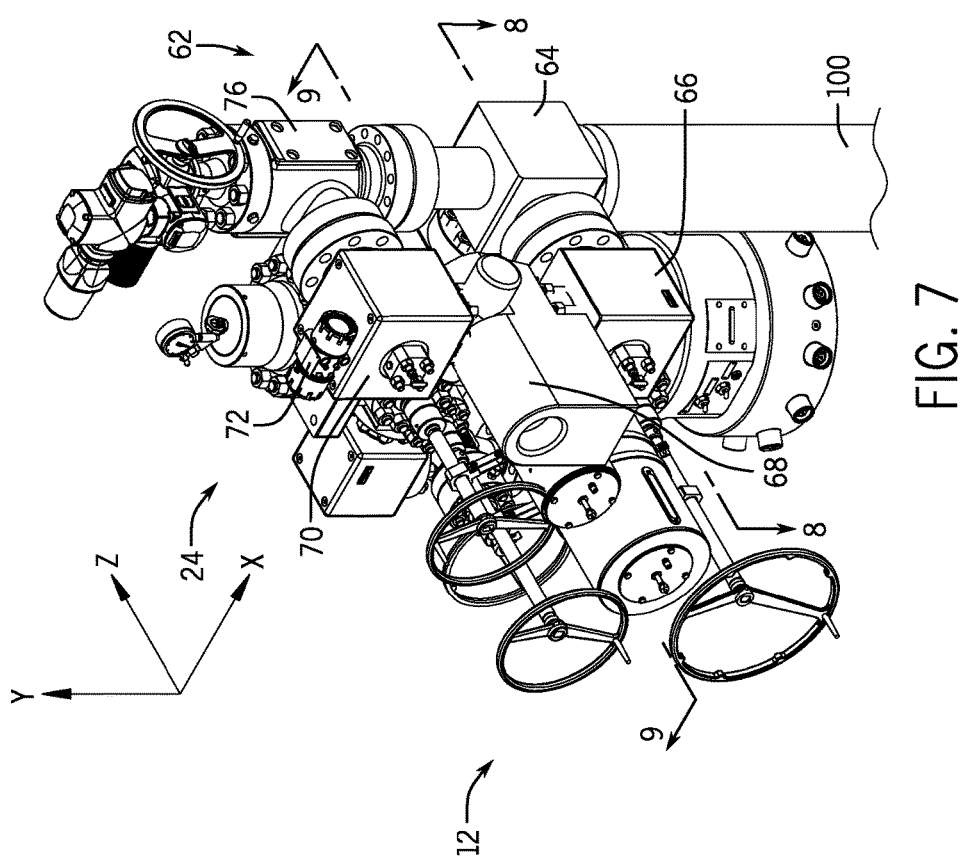
FIG. 7 is a perspective view of the wellhead assembly with an embodiment of the flow control module installed.

FIGS. 7-9 show various views of an embodiment of the flow control module 62 that is generally aligned with the Z-axis. In operation, the functionality of the configuration shown in FIGS. 7-9 may not differ from another configuration (e.g., the flow control module generally aligned with the X-axis shown in FIGS. 4-6). However, spatial constraints around the wellhead assembly 12 may make one configuration more desirable for a given application than another. Alignment of the flow control module 62 with the Z-axis is accomplished by utilizing an embodiment of the flow-through component 64 that bends or directs the produced fluid flow 90 degrees.

FIG. 7 is a perspective view of the embodiment of the flow control module 62 that is generally aligned with the Z-axis. As with the embodiment shown in FIGS. 4-6, the flow-through component 64 and choke 76 are disposed above the production flow line 100. The first elbow 66, the multi-phase flow meter 68, the second elbow 70, and the scanner 72 are positioned adjacent to the flow-through component 64 and choke 76, but are adjacent in the Z-direction rather than in the X-direction (e.g., as shown in FIG. 4). In order to accommodate the flow control module 62 being generally aligned with the Z-axis, the flow through component 64 in the illustrated configuration includes a bend. That is, produced fluid flowing through the annular passage 92 exits the annular passage 92 in a different direction than it enters the annular passage. Production fluid flow through the flow through component 64 is discussed in more detail below with regard to FIG. 8.

FIG. 8 is a section, top view taken along line 8-8 of FIG. 7, illustrating a fluid flow path for produced fluid flow through the flow-through component 64. As with the configuration shown in FIGS. 4-6, produced flow is routed in the X-direction (arrow 78) from the tree 24 and into the flow-through component 64 via the first inlet 74. The produced fluid flows through the entry bore 102 to the annular passage 92. As the produced fluid flow reaches the annular passage 92, the produced fluid flow is split (arrows 130, 132) and diverted around the central flow through bore 90 of the flow-through component 64. The annular passage 92 is annular about the central axis of the central flow through bore 90 (e.g., arrow 118 in FIG. 9). The downstream portion of the produced fluid flows in the Y-direction through the central flow-through bore 90, which is segregated from the annular passage 92 by an annular wall 104. The split produced fluid flows (arrows 130 and 132) converge and exit the annular passage 92 flowing in the Z-direction (arrow 112). In order to facilitate alignment of the flow control module 62 with the Z-direction, the annular passage 92 includes a bend such that produced fluid exits the annular passage 92 in a different direction than it entered. In the illustrated embodiment, the annular passage 92 includes a 90-degree turn such that produced fluid enters the annular passage 92 flowing in the X-direction and exits the annular passage 92 flowing in the Z-direction. However, the annular passage 92 may include a bend of 30, 35, 40, 45, 50, 55, 60, 65, 70, 75, 80, 85, 90, 95, 100, 105, 110, 115, 120 degrees, or some other angle. Because of the bend in the annular passage 92, one of the split produced fluid flows (arrow 132) travels a longer path through the annular passage 92 than the other (arrow 130). Upon exiting the annular passage 92, the produced fluid flows in the Z-direction (arrow 112) through the exit bore 106. Because of the turn in the annular passage 92, the entry bore 102 and the exit bore 106 are not aligned with one another. In the illustrated embodiment, the entry bore 102 and the exit bore 106 are transverse to one another (i.e., the entry bore 102 extends in the X-direction and the exit bore 106 extends in the Y-direction.) However, dependent upon the angle of the bend in the annular passage 92, the entry bore 102 and the exit bore 106 may be oblique to one another. The produced fluid flow exits the flow-through component via the first outlet 86 and proceeds (arrow 112) into the first elbow 66.

FIG. 9 is a section, side view taken along line 9-9 of FIG. 7, illustrating a fluid flow path for produced fluid flow through the remainder of the flow control module 62.

Produced fluid exits the flow through component 64 via the first outlet 86 and proceeds in the Z-direction (arrow 112) into the first elbow 66. The produced fluid flows through the fluid passage 67 of the first elbow 66. The fluid passage 67 bends the flow 90-degrees, causing it to flow in the Y-direction (arrow 114).

The flow exits the first elbow 66 and enters the multi-phase flow meter 68. As previously discussed, the multi-phase flow meter 68 takes various measurements (e.g., water-to-gas ratio, flow rate, composition of the flow's constituents, etc.) of the fluid as it flows through the multi-phase flow meter 68. The produced fluid flow exits the multi-phase flow meter 68 flowing in the Y-direction (arrow 80) and enters the second elbow 70, which includes the passage 71. The second elbow 70 bends or directs the flow in the Z-direction (arrow 116).

The second elbow 70 is coupled to the choke 76. The produced fluid flow enters the choke 76, which conditions the flow by affecting its flow rate and/or pressure. The choke 76 includes a bend that directs the produced fluid flow in the Y-direction (arrow 118). Upon being directed in the Y-direction by the choke, the produced fluid flow is aligned with the production flow line 100.

The produced fluid flow exits the choke 76 and enters the central flow-through bore 90 of the flow-through component 64 via the second inlet 89. The produced fluid flows in the Y-direction (arrow 118) through the central flow-through bore 90. The central flow through bore 90 extends through the middle of, and is segregated from, the annular passage 92 (see FIG. 8). The produced fluid exits the central flow-through bore 90 of the flow-through component 64 via the second outlet 94 and enters the production fluid flow line 100.

Figure 10:
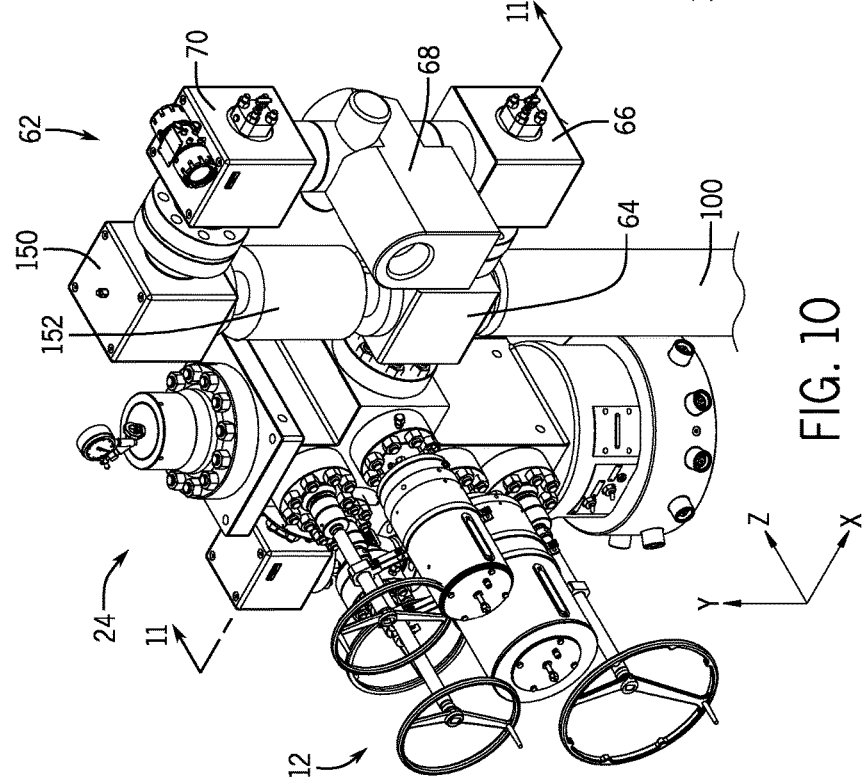
FIG. 10 is a perspective view of the wellhead assembly with an embodiment of the flow control module having an in-line choke.

FIG. 10 is a perspective view of an embodiment of the flow control module 62 having an in-line choke 152. As with the embodiment shown and discussed with regard to FIGS. 4-6, the flow control module 62 includes a flow through component 64, a first elbow 66, a multi-phase flow meter 68, and a second elbow 70. Instead of a choke 76 with a bend (see FIGS. 4 and 5), the illustrated embodiment includes a third elbow 150 and an inline choke 152.

Figure 11:
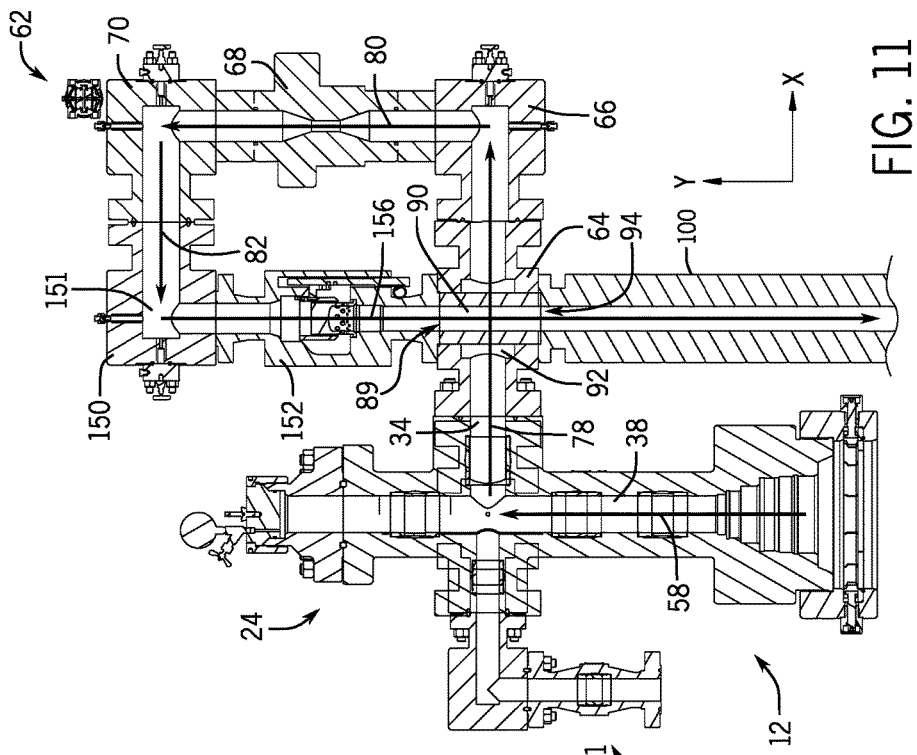
FIG. 11 is a section, side view of the flow control module shown in FIG. 10.

FIG. 11 is a section, side view taken along line 11-11 of FIG. 10 illustrating the fluid flow path for the produced fluid flow through the flow control module 62. As with the embodiment shown in FIG. 5, produced fluid flows in the X-direction (arrow 78) from the tree 24, through the annular passage 92 of the flow-through component 64, and into the first elbow 66. The first elbow 66 bends or directs the flow in the Y-direction (arrow 80). Produced fluid flows through the multiphase flow meter 68, and into the second elbow 70, which bends or directs the flow in the X-direction (arrow 82). Rather than exiting the second elbow 70 and flowing into the choke 76, as shown in FIG. 5, the produced flow enters a third elbow 150, which includes a passage 151. The third elbow bends or directs the produced fluid flow in the Y-direction (arrow 156). Upon being directed in the Y-direction, the produced fluid is substantially aligned with the production flow line 100. Produced fluid flow exits the third elbow 150 traveling in the Y-direction (arrow 156) and flows through the in-line choke 152, which conditions the flow by affecting its flow rate and/or pressure.

The produced fluid flow exits the in-line choke 152 and enters the central flow-through bore 90 of the flow-through component 64 via the second inlet 89. The produced fluid flows through the central flow-through bore 90 in the Y-direction (arrow 156), exits the central flow-through bore 90 of the flow-through component 64 via the second outlet 94, and then enters the production fluid flow line 100.

FIG. 12 is a perspective view of an embodiment of the flow control module 62 aligned in the Z-direction, having an in-line choke 152 and a flow-through component 64 with a bend. As with the embodiment shown and discussed with regard to FIGS. 7-9, the flow control module 62 includes a flow through component 64 with a bend, a first elbow 66, a multi-phase flow meter 68, and a second elbow 70. Instead of a choke 76 with a bend (see FIGS. 7 and 9), the illustrated embodiment includes the third elbow 150 and the inline choke 152, similar to the embodiment of the flow control module 62 shown in FIGS. 10 and 11.

FIG. 13 is a side, section view taken along line 13-13 of FIG. 12 illustrating the fluid flow path for the produced fluid flow through the flow control module 62. As with the embodiment shown in FIG. 9, produced fluid exits the flow-through component 64 flowing in the Z-direction (arrow 112) and enters the first elbow 66. The first elbow 66 bends or directs the flow in the Y-direction (arrow 114). Produced fluid flows through the multiphase flow meter 68, and into the second elbow 70, which bends or directs the flow in the Z-direction (arrow 144). Rather than exiting the second elbow 70 and flowing into the choke 76, as shown in FIG. 9, the produced flow enters a third elbow 150, which includes a passage 151, similar to the embodiment shown in FIG. 11. The third elbow bends or directs the produced fluid flow in the Y-direction (arrow 180). Upon being directed in the Y-direction, the produced fluid is substantially aligned with the production flow line 100. Produced fluid flow exits the third elbow 150 traveling in the Y-direction (arrow 180) and flows through the in-line choke 152, which conditions the flow by affecting its flow rate and/or pressure.

The produced fluid flow exits the in-line choke 152 and enters the central flow-through bore 90 of the flow-through component 64 via the second inlet 89. The produced fluid flows through the central flow-through bore 90 in the Y-direction (arrow 180), exits the central flow-through bore 90 of the flow-through component 64 via the second outlet 94, and then enters the production fluid flow line 100.

The disclosed techniques allow for the installation of one or more components between the production fluid bore 34 and the production flow line 100 without having to reposition either. Present embodiments include replacing the choke 60 on an existing wellhead assembly 12 with the flow control module 62. The flow control module 62 may include the flow-through component 64 (e.g., with or without a bend), the multi-phase flow meter 68, the scanner 72, the choke (e.g., the in-line choke 152, or the choke 76 that includes the bend), and one or more of the 90-degree bends 66, 70, 150. Some embodiments of the flow control module 62 may include additional components that may be related to monitoring or controlling fluid flowing through the flow control module 62. For example, the flow control module may also include chemical injection points, diagnostic monitoring components, automated gate valve greasing components, automated flow control components, and the like installed between the various components shown and described herein. The flow control module described herein may be adapted to include new monitoring and control equipment as it becomes available. Accordingly, the flow control module 62 may include any combination of the aforementioned components. The disclosed techniques allow a user to utilize more recent or different monitoring and control equipment without undertaking the considerable effort and expense of replacing the entire wellhead assembly. Though some of the disclosed embodiments may be directed to retrofitting existing wellhead assemblies, the disclosed techniques may also be applied to new wellhead assemblies 12.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A surface wellhead assembly, comprising:
 a flow-through component configured to be fluidly coupled to a wellhead or tree, the flow through component comprising an annular passage disposed about a central flow-through bore, wherein the annular passage is transverse to the central flow-through bore, and wherein the central flow-through bore is downstream of the annular passage, wherein the flow-through component comprises an entry bore extending from a first inlet to the annular passage, and an exit bore extending from the annular passage to a first outlet, wherein the entry bore and the exit bore are substantially aligned with one another with respect to an axis extending through the central flow-through bore;
 a first 90-degree elbow fluidly coupled to the flow-through component;
 a multi-phase flow meter fluidly coupled to the first 90-degree elbow and disposed downstream of the first 90-degree elbow;
 a second 90-degree elbow fluidly coupled to the multi-phase flow meter and disposed downstream of the multi-phase flow meter;
 a monitor fluidly coupled to the second 90-degree elbow; and
 a choke fluidly coupled to the second 90-degree elbow and disposed downstream of the second 90-degree elbow, wherein, the central flow-through bore is downstream of the choke.

2. The surface wellhead assembly of claim 1, wherein the annular passage and the central flow-through bore are segregated from one another by an annular wall.

3. The surface wellhead assembly of claim 1, wherein the entry bore and the exit bore are substantially transverse to one another.

4. The surface wellhead assembly of claim 1, wherein the choke comprises a 90-degree bend.

5. The surface wellhead assembly of claim 1, comprising a third 90-degree elbow fluidly coupled to the second 90-degree elbow and disposed downstream of the second 90-degree elbow, and wherein the choke comprises an in-line choke.

6. The surface wellhead assembly of claim 1, wherein the system is configured to be installed on an existing wellhead or tree assembly, wherein the flow-through component is coupled to a production fluid bore of the existing wellhead assembly.

7. A system, comprising:
 a tubing spool, comprising:
  a tubing spool bore; and
  a production fluid bore extending from the tubing spool bore;
 a tubing hanger comprising a tubing hanger bore, the tubing hanger disposed within the tubing spool bore, wherein the production fluid bore is fluidly coupled to the tubing hanger bore;
 a flow control module, comprising:
  a flow-through component coupled to the tubing spool, wherein the flow-through component is fluidly coupled to the production fluid bore, wherein the flow-through component comprises an annular passage and a central flow-through bore, wherein the annular passage is transverse to the central flow-through bore and extends around the central flow-through bore, wherein the flow-through component comprises an entry bore extending from a first inlet to the annular passage, and an exit bore extending from the annular passage to a first outlet, wherein the entry bore and the exit bore are substantially aligned with one another with respect to an axis extending through the central flow-through bore;
  a first elbow fluidly coupled to the flow-through component;
  a multi-phase flow meter fluidly coupled to the first elbow and disposed downstream of the first elbow;
  a second elbow fluidly coupled to the multi-phase flow meter and disposed downstream of the multi-phase flow meter; and
  a choke fluidly coupled to the second elbow and disposed downstream of the second elbow, wherein, in operation, the second portion of the fluid flow path is downstream of the choke.

8. The system of claim 7, wherein the entry bore and the exit bore are substantially transverse to one another.

9. The system of claim 7, wherein the choke comprises a 90-degree bend.

10. The system of claim 7, comprising a third elbow fluidly coupled to the second elbow and disposed downstream of the second elbow.

11. The system of claim 10, wherein the choke comprises an in-line choke.

12. The system of claim 7, wherein the tubing spool, and the tubing hanger are part of an existing wellhead assembly.

13. A method, comprising:
 removing a first choke from a wellhead assembly;
 installing a flow control module, wherein the flow control module comprises:
  a flow-through component coupled to the tubing spool, wherein the flow-through component is fluidly coupled to the production fluid bore, wherein the flow-through component comprises an annular passage and a central flow-through bore, wherein the annular passage is transverse to the central flow-through bore and extends around the central flow-through bore, wherein the annular passage and the central flow-through bore are segregated from one another by an annular wall, wherein the flow-through component comprises an entry bore extending from a first inlet to the annular passage, and an exit bore extending from the annular passage to a first outlet, wherein the entry bore and the exit bore are substantially aligned with one another with respect to an axis extending through the central flow-through bore;
  a first elbow fluidly coupled to the flow-through component;
  a multi-phase flow meter fluidly coupled to the first elbow and disposed downstream of the first bend;

a second elbow fluidly coupled to the multi-phase flow meter and disposed downstream of the multi-phase flow meter; and a second choke fluidly coupled to the second elbow and disposed downstream of the second elbow, wherein, in operation, the second portion of the fluid flow path is downstream of the choke.

14. The method of claim 13, wherein the first choke is moved to the location of the second choke such that the first choke operates as the second choke.

15. The method of claim 13, comprising:
coupling the first choke to the second elbow; and
coupling the first choke to the central flow-through bore of the flow-through component.

16. The method of claim 13, comprising:
coupling the first choke to a third elbow; and
coupling the first choke to the central flow-through bore of the flow-through component.

* * * * *